Figure 1:
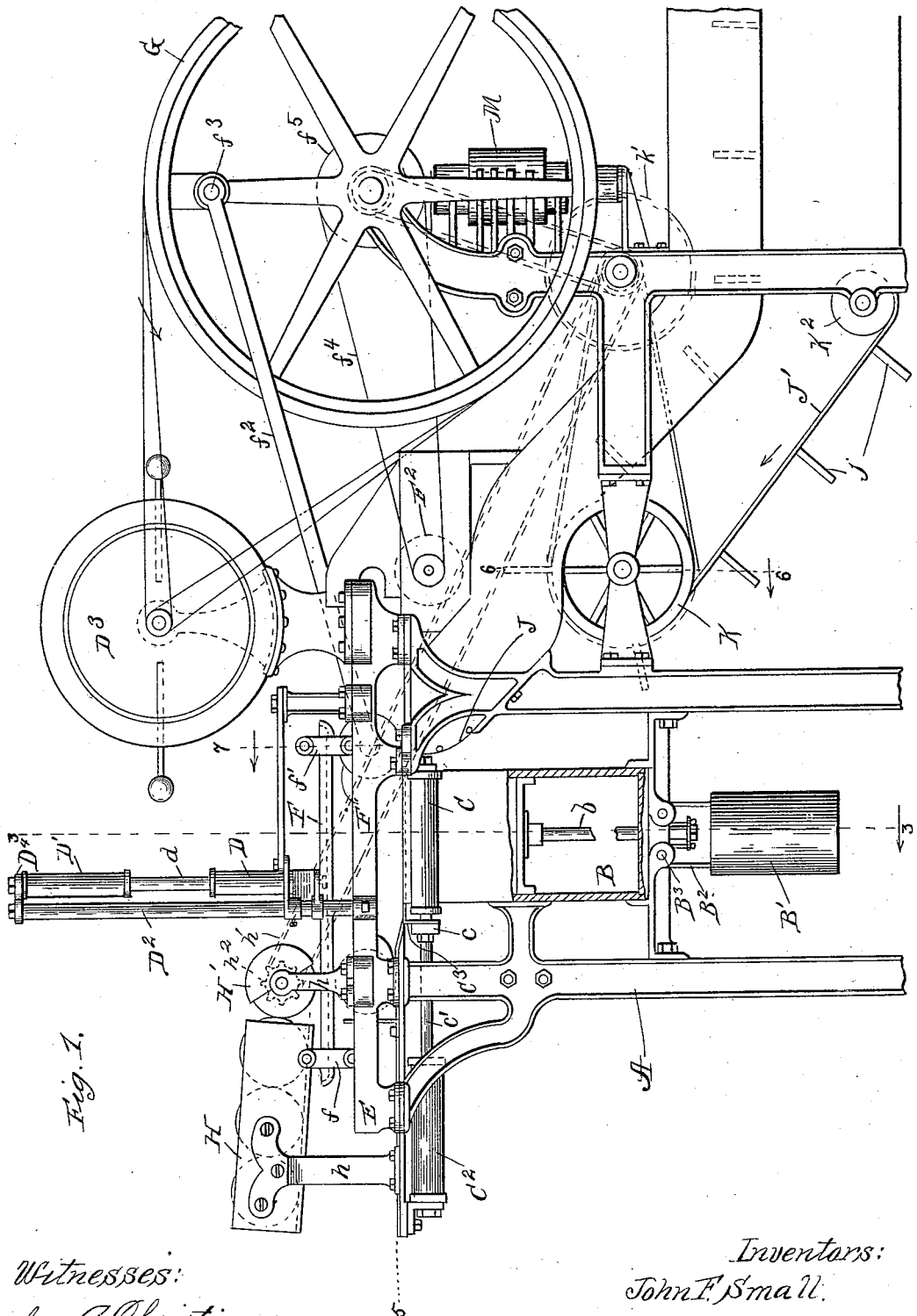

(No Model.)   7 Sheets—Sheet 1.

J. F. SMALL & J. S. BIGGAR.
LABELING MACHINE.

No. 557,087.   Patented Mar. 24, 1896.

Witnesses:
Jno. A. Christianson.
H. F. Thomsen.

Inventors:
John F. Small.
John S. Biggar.
By Samuel E. Hibben
Atty.

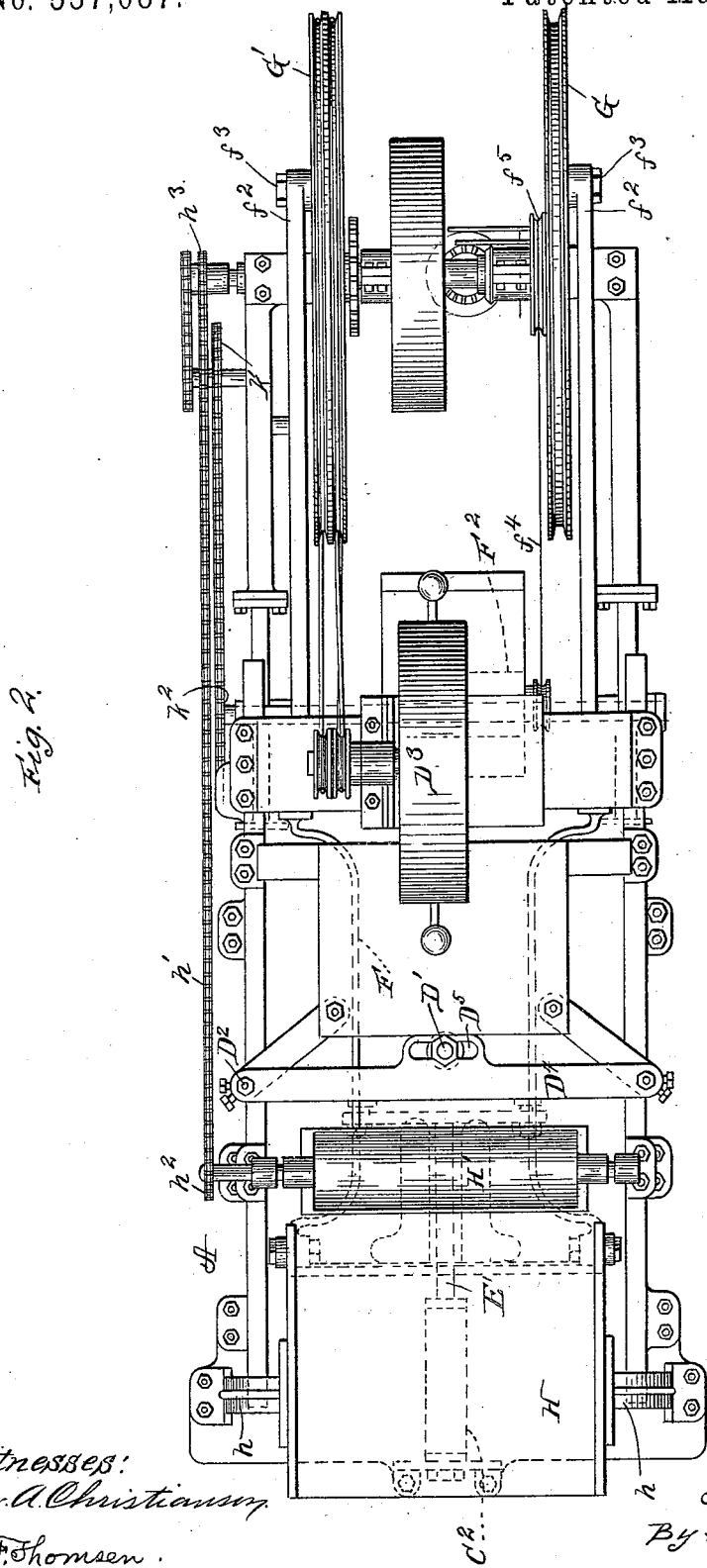

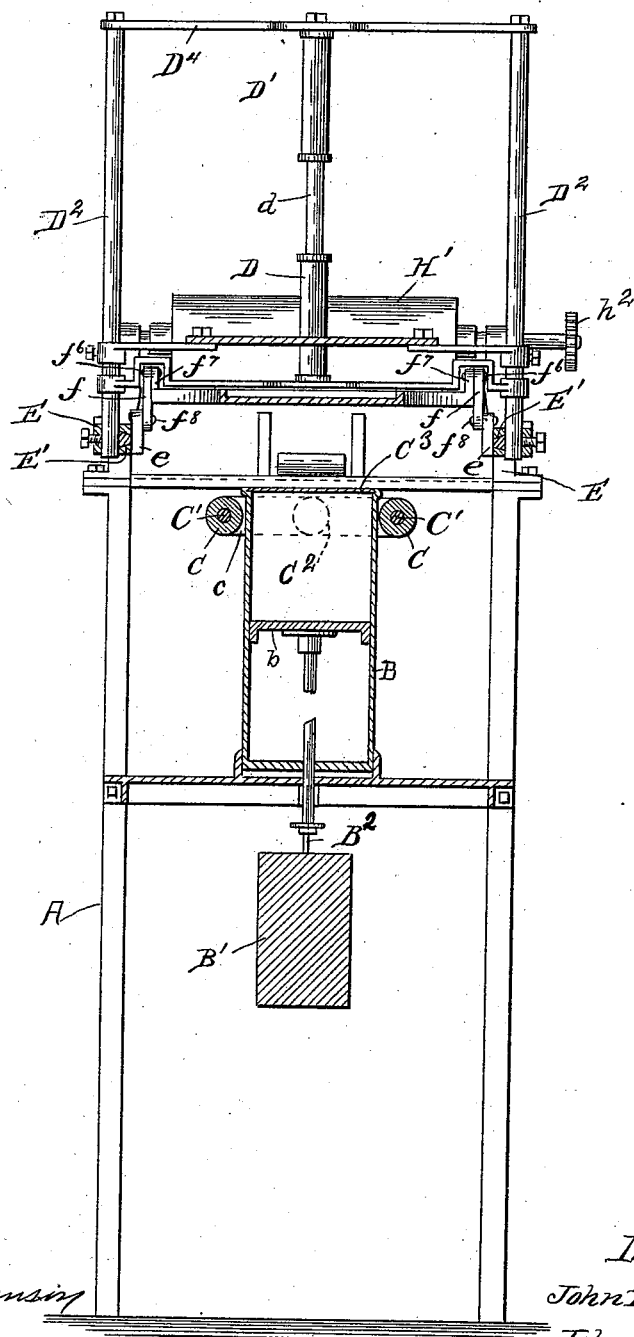

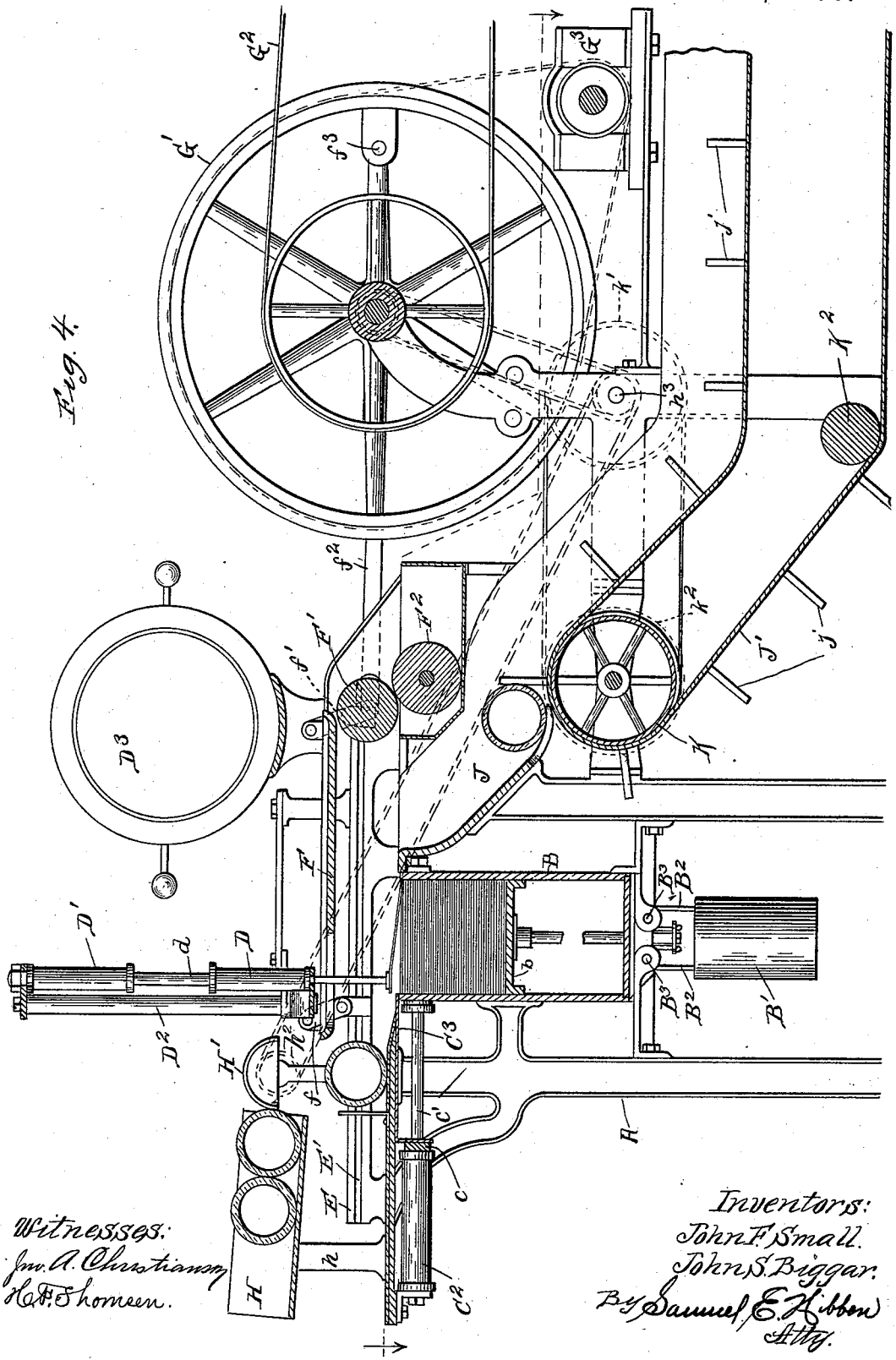

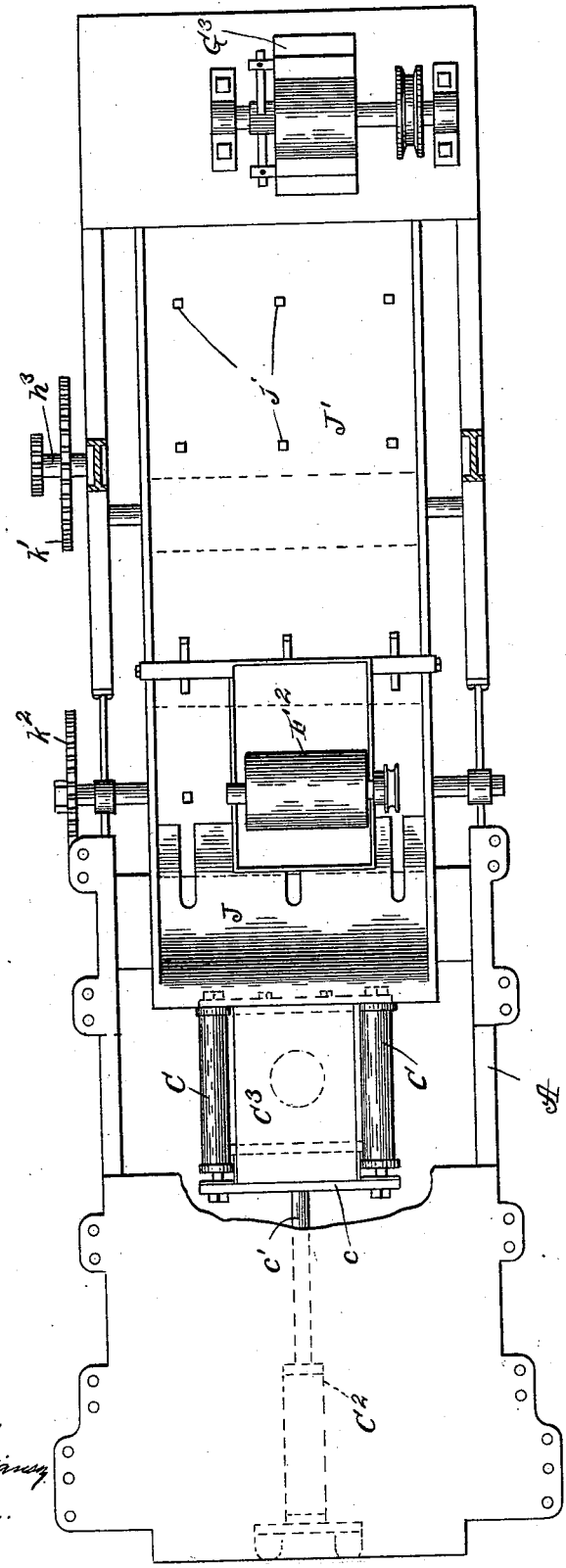

(No Model.) 7 Sheets—Sheet 6.
J. F. SMALL & J. S. BIGGAR.
LABELING MACHINE.
No. 557,087. Patented Mar. 24, 1896.
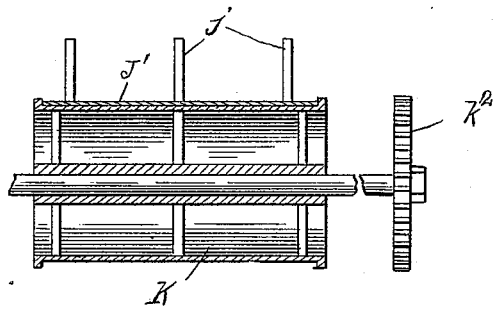
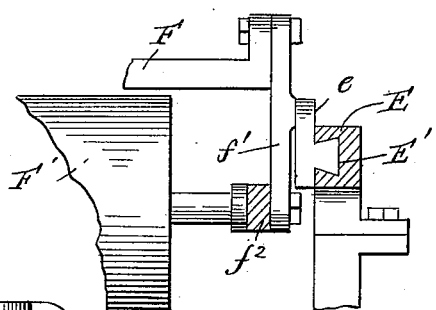
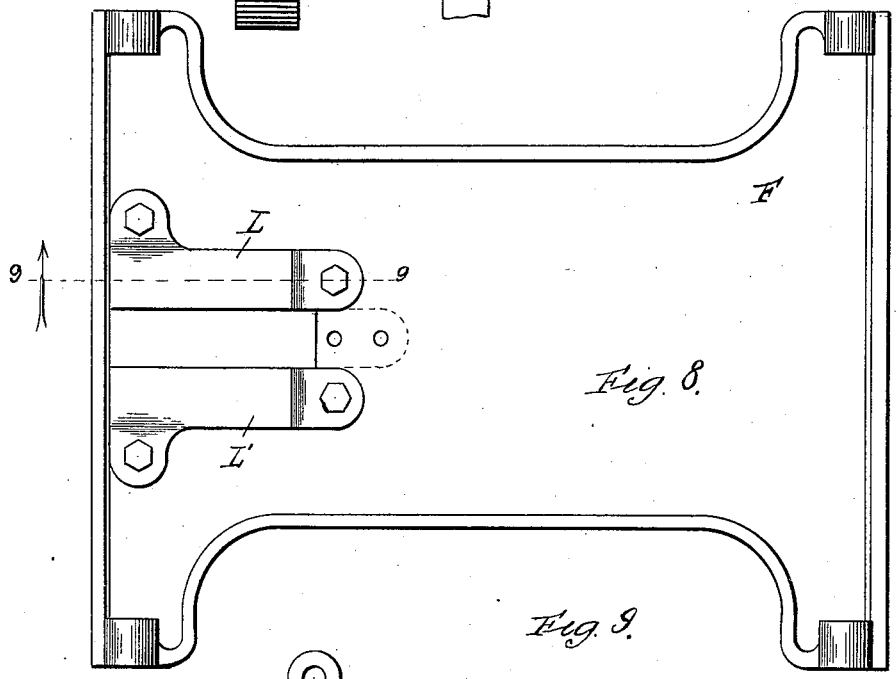
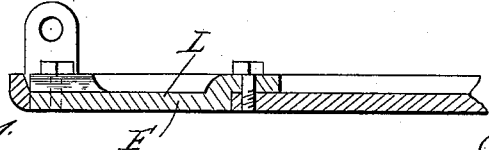
Witnesses:
Jno. A. Christianson
H. P. Thomsen
Inventors:
John F. Small
John S. Biggar
By Samuel E. Hibben
Atty.

(No Model.)  J. F. SMALL & J. S. BIGGAR.  7 Sheets—Sheet 7.
LABELING MACHINE.
No. 557,087.   Patented Mar. 24, 1896.
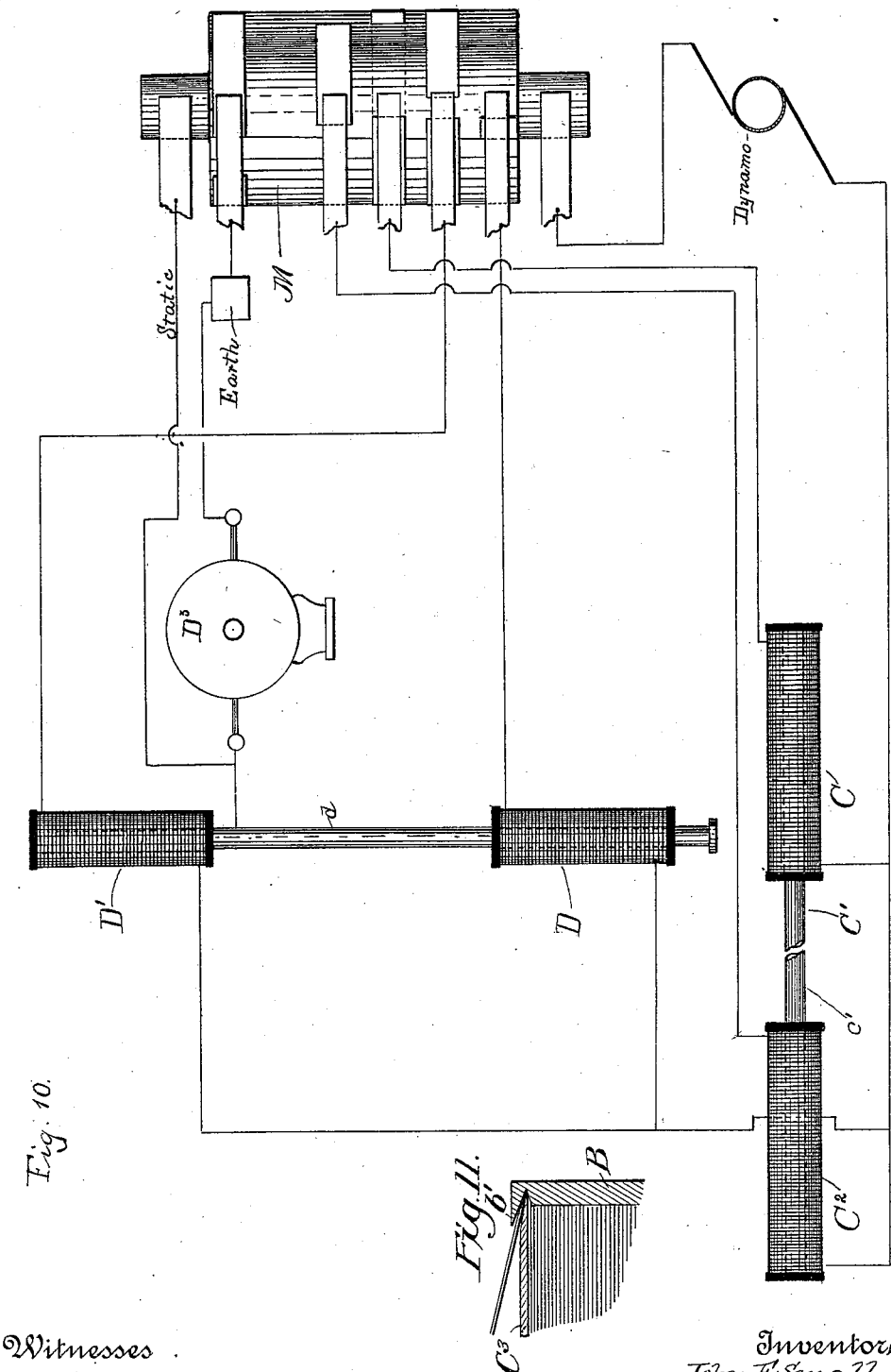
Witnesses
Jno. A. Christiansen
H. F. Thomsen.
Inventors:
John F. Small
John S. Biggar.
By their Attorney
Samuel E. Hibben.

UNITED STATES PATENT OFFICE.

JOHN FRANCIS SMALL AND JOHN STUART BIGGAR, OF CHICAGO, ILLINOIS, ASSIGNORS OF ONE-HALF TO HENRY GUGLER, OF MILWAUKEE, WISCONSIN.

LABELING-MACHINE.

SPECIFICATION forming part of Letters Patent No. 557,087, dated March 24, 1896.

Application filed July 8, 1895. Serial No. 555,233. (No model.)

*To all whom it may concern:*

Be it known that we, JOHN FRANCIS SMALL and JOHN STUART BIGGAR, citizens of the United States, and residents of Chicago, in the county of Cook and State of Illinois, have invented certain new and useful Improvements in Labeling-Machines, of which the following is a specification.

The object of our invention is to provide a simple, reliable, and efficient apparatus for attaching labels, &c., to bottles, boxes, or packages and articles of any description, shape, or size. This apparatus in its complete and preferable form is designed to be automatic in all its operations, thereby assuring uniformity of work as well as rapidity and regularity of action; and our invention consists of the features and details of construction hereinafter described and claimed.

In the drawings, Figure 1 is a side elevation of the machine; Fig. 2, a plan view thereof; Fig. 3, a view taken on line 3 of Fig. 1; Fig. 4, a central sectional view of the machine, showing a different relative position of parts than is shown in Fig. 1; Fig. 5, a plan view taken below line 5 of Fig. 1, some of the parts having been removed; Fig. 6, a sectional view taken on line 6 of Fig. 1, showing the conveying apron or belt; Fig. 7, a sectional view taken on line 7 of Fig. 1, showing attachment and operation of the traveling paste-roller and pressure-frame; Fig. 8, a detail view of the pressure-frame; Fig. 9, a sectional view taken on line 9 of Fig. 8; Fig. 10, a diagrammatic view showing the rotating switch and the arrangement of electrical circuit to operate the various parts of a machine at predetermined times to produce the proper sequence of action; and Fig. 11 a sectional view showing the shoulder or flange at the top of the label-box and the position of the slide-plate beneath a label.

For the sake of brevity and clearness we have shown and described our invention as used particularly for the purpose of attaching labels to bottles; but it will be understood that we do not intend to limit ourselves thereto, as it is obvious that the machine may be used for affixing labels to articles of any description by simply making mechanical changes and without departing from the spirit of our invention.

The machine consists of a suitable frame A, on which the various operative parts are secured or mounted. Arranged below the bed-level of the machine is a label receptacle or holder B, from whose open top the labels are designed to be fed. This feeding is accomplished preferably in the manner shown particularly in Fig. 3 of the drawings by means of a piston $b$, traveling in the holder and adapted to be continually pressed against the contained pile of labels by the weight $B'$, whereby a uniform upward feed is obtained. Cords $B^2$, fastened to the weight, are run over pulleys $B^3$, secured rigidly to the frame, and their free ends are secured to the end of the piston $b$. It is obvious that the gravity of the weight tends to force the piston upward.

It is understood that the receptacle or holder is made of the proper size and dimensions to accommodate the particular size and shape of label used. Upon one side of the holder is arranged a shoulder or flange $b'$, (see Fig. 11,) which normally prevents the labels from being forced from the holder. Any other suitable means, however, may be employed for obtaining the desired feed.

Preferably at each side of the label-holder we arrange solenoids C C having cores $C'$, which are connected together by means of a yoke $c$ so as to operate in unison. To the left of these solenoids, Fig. 1, we support preferably a single solenoid $C^2$ having a horizontally-reciprocating core $c'$ adapted to travel therein, one of whose ends adjacent to the set of solenoids C is secured to the yoke. The arrangement of these solenoids is clearly illustrated in Figs. 1 and 3 of the drawings, and although we prefer to use the number of them shown it would be understood that a single solenoid might answer the purpose of the set of solenoids C C.

To the yoke or to the cores $C'$, as desired, is secured a flat horizontal plate $C^3$, which may be termed a "slide-plate," which is adapted to be reciprocated just above the open end of the label box or holder by means of the alternate or successive action of the solenoids upon their respective cores, whereby a reciprocating motion of such plate is obtained. In the position shown in Fig. 1 the solenoids C have been energized and have drawn the plate to the right and over the open end of the box. When the solenoid $C^2$ is energized the current in the double solenoids having been broken, the plate is positively reciprocated to the left and just clear of the label-holder. The electrical circuits and the circuit-breakers for the proper operation of the solenoids will be hereinafter described in detail.

Supported in any suitable manner above the bed of the machine, as by means of the upright standard $D^2$ arranged on the frame, are two solenoids D D' in axial alignment and having a core or plunger $d$ common to both solenoids and substantially at right angles to the label-box.

As shown in plan in Fig. 2, the two standards $D^2$ are connected together at their top by a cross-piece $D^4$, which is provided substantially at its middle with a slot $D^5$ to adjustably secure the head of the solenoid. In the drawings the solenoid is shown in position along the central line of the machine; but its position may be shifted either to the right or left to accommodate and properly operate upon different shapes and sizes of labels, as hereinafter described.

As shown particularly in Fig. 10 of the drawings, the electrical circuits of these solenoids are so arranged and the circuits completed by a circuit-breaker that when one solenoid is energized the other is demagnetized—that is to say, their action is alternative or successive—so that the core is positively reciprocated up and down. This core is connected electrically in any desired manner with an ordinary frictional or static electrical machine $D^3$, which is mounted upon the frame and adapted to supply the core with the necessary electricity. This static machine may be dispensed with and in lieu thereof friction-producing devices may be arranged adjacent to the core and plunger in its path of travel and the static electricity produced directly in the plunger during its reciprocation.

We will now proceed to describe briefly the operation only of those parts of the machine thus far spoken of.

The solenoid D is energized, reciprocating core $d$ downward so as to approach one side of the top label in the label box or holder. The plate $C^3$ at this time is understood to be at its extreme limit of stroke to the left, Fig. 1. The ends of the plunger or core are charged with electricity, and, according to the well-known laws, the top label is thereby attracted or lifted up at one side by the plunger or core, after which the solenoids C are energized and the plate $C^3$ caused to advance underneath the label thus attracted, thereby separating such label from the second and the pile of those immediately beneath. The lifting of the label is clearly shown in Fig. 4, in which the relative position of parts is illustrated just previous to the reciprocation of the slide-plate to the right between the top and the second label. This reciprocation of the plate is the next movement in the sequence of operations of the machine. A horizontal frame E is mounted upon the machine bed or frame and is provided with horizontal guideways E', whose preferable form is shown in Fig. 7. This guide-frame is designed to permit of the reciprocation of a cross-head carrying a paste-roll and a device for rolling or pressing the bottles over the labels. This cross-head consists of a frame $e$ adapted to slide in the channels or ways of the frame E. The bottle rolling and engaging device consists of a horizontal plate F, which we term a "pressure-plate," arranged above these guides and pivotally connected thereto by means of links $f f'$, whereby it may have both a swinging and a reciprocating motion. The links $f'$ are somewhat longer than the links $f$ and are extended below the point of connection with the cross-head frame, where they are provided with suitable bearings to receive the gudgeons or short shafts of a traveling paste-roller F'. The construction of these various parts will be readily apparent from an inspection of Fig. 7.

Referring to Fig. 3 of the drawings, the links $f$ are pivoted to the swinging frame or pressure-plate by means of pins or bolts $f^6$ passing through the links and also through ears $f^7$ upon the plate. The other ends of the links are pivotally connected to the cross-head $e$ by bolts or pins $f^8$.

At the right hand of the machine, Fig. 1, is mounted the driving mechanism, consisting of suitably-journaled pulleys G G' rotated by means of the belt $G^2$ connected to a desired source of power. These pulleys operate other pulleys and sprocket-wheels, which are necessary to drive and actuate the various mechanisms of the machine.

The paste-roller F' is actuated by means of the crank-arms $f^2$, connected, respectively, to the crank-pins $f^3$ on the drive wheels or pulleys G G' and to the shaft of the roller below the pivotal point of the link $f'$. Within a suitable paste box or receptacle of the proper shape and dimensions is journaled a rotatable paste-roller $F^2$, whose lower periphery dips into the paste at all times and whose function is to feed paste, by its constant rotation, to the other roller when brought into close proximity. As shown in Fig. 2, motion is communicated to the roller $F^2$ by means of a belt $f^4$ running around a pulley $f^5$ on the main shaft.

At the extreme left of the machine, Fig. 1, is the bottle-feed chute or incline H, which is supported at the required elevation. At the mouth or open end of this chute is a device which may be termed a "bottle-gate," for convenience, and which consists of a rotatable roller H', mounted in suitable bearings in upright standards $h$, secured to the machine-frame. This roller is cut away, partially, so that it is somewhat semicircular in cross-section, to accommodate it to the particular article here to be labeled—that is, a bottle.

It is obvious that when the full face of the gate is presented to the bottles pressing thereagainst by gravity the bottles will be held in the chute, but that when the opposite face is presented a single bottle will be allowed to pass or fall through to the bed of the machine to be operated upon by the label-attaching devices proper. It will be understood in this connection that the particular contour of the gate may be altered to suit circumstances and the character of the package or article to be labeled. The roller may be rotated by any suitable connection with the driving mechanism—as, for instance, by the sprocket-chain $h'$ running around sprocket-wheel $h^2$ and around the wheel $h^3$ driven by pulley $G'$. The various pulley and sprocket wheels are so made that they will cause the mechanism which they control to operate at the proper predetermined times.

Forward of the label-box is arranged the bottle-delivery, which consists of an inclined chute J, leading from the machine-bed downward to a horizontally-traveling endless belt or apron $J'$, forming a continuation of the delivery and adapted to carry the bottles to the place desired. At preferably equidistant points along the apron are a series of upright fingers $j$, which are preferably covered with rubber or other cushioning material, to separate the bottles or to prevent their breakage by coming into contact with each other or by their descent in the inclined chute. As shown in Figs. 1 and 2, the apron is operated by means of the pulley K, which is rotated by the sprocket-wheel $k^2$, receiving its motion from the sprocket-wheel $k'$ on the shaft $h^3$, although any other suitable connection with the driving mechanism may be adopted. As shown in the drawings, we prefer to provide the apron with an idler $K^2$.

As detailed in Figs. 8 and 9, the pressureplate is provided with a series of removable plates or strips L L', the middle plate being shown removed to allow the plunger or core to pass therethrough. The object of these plates is to accommodate the different sizes and widths of labels used, as it is desirable that the plunger should approach the label at substantially the middle point of one side or edge. To this end the position of the solenoids and their plungers may be shifted in the slot $D^5$, as hereinafter described, and the plate or strip directly beneath the plunger may be removed to accommodate the same.

A dynamo $G^3$ may be connected to one of the main drive wheels or pulleys in order to supply the necessary current to operate the solenoid, although the current may, if desired, be derived from an independent source.

In all present label-machines it is impossible to attach labels of different shapes without materially altering the machine or reconstructing the same, but in our machine any shape of label may be equally provided for. For instance, take a diagonal or circular label where the paste is liable to be smeared over the plate not covered by the label. In our machines such a label can be readily provided for by attaching to the upper face of the slideplate a thin supplemental plate having the same shape or contour as the label that is to be attached, so that the label alone will receive paste.

The various parts being constructed and arranged as hereinbefore described and explained, we will now proceed to describe the various operations and follow the passage of a bottle from its initial position in the feedchute through the labeling devices and finally out from the delivery-chute to the apron with its label attached.

The bottle is first admitted from the feedchute through the gate and allowed to fall upon the bed of the machine. At this instant the plunger is reciprocated downward to approach the top label in the box, and simultaneously the earth connection of the static machine is broken by the rotating switch device, thereby charging the plunger with static electricity. The relative position of parts at this stage of the operation of the machine is shown in Fig. 4, wherein the top label is seen to be attracted and held up by the plunger. Next, the circuits in which solenoids C C are interposed are completed by the switch device and the solenoids energized, sucking in their cores and reciprocating the slide-plate beneath the label thus attracted or lifted. The position of the slide-plate beneath the attracted label is clearly shown in Fig. 11. Immediately the traveling pasteroller is caused to pass over the label and apply paste thereto. In the withdrawal of this roller the pressure-plate is caused to swing downward by reason of the peculiar manner of pivoting the same upon links, in one set of which the paste-roller is journaled. In thus swinging down the frame engages the bottle and in its reciprocation, being drawn to the left, Fig. 1, during the withdrawal of the paste-roller, presses and rolls the same over the label. The bottle thus picks up the label, which is firmly pressed upon and attached to the bottle in the rolling operation to which it is subjected. On reaching the proper opening in the machine-bed the bottle falls downward into the delivery-chute, from which it is carried to the place desired by the communicating delivery apron or carrier.

As shown in Fig. 10, one of the poles of the static machine is permanently connected to earth or grounded, while the other pole is also grounded, except at predetermined intervals when its earth connection is broken by the switch device, at which time the electricity will charge the core $d$, which is insulated and connected to this particular pole. After the core has raised a label it is discharged of its electricity by the completion of the earth connection by the rotation of the cylinder-switch M.

Fig. 10 clearly shows in diagram the arrangement of the various circuits and the construction of the rotatable circuit-breaker, which is in the form of a cylinder having contact points or strips on its periphery, whereby the solenoid-circuits may be successively or alternately made and broken in order to reciprocate the cores, so as to cause the various parts of the machine to operate at proper predetermined intervals.

By the use of our invention an automatic machine may be constructed which will be very simple, rapid and reliable in operation, and one which by simple mechanical changes may be adapted to attach labels of any shape and size to a great variety of articles.

Although we have described more or less precise forms and details of construction, we do not wish to be understood as limiting ourselves thereto, as we contemplate changes in form, proportion of parts, and the substitution of equivalents as circumstances may suggest or render expedient and without departing from the spirit or scope of our invention; and although we have shown our machine as driven entirely by electricity it is obvious that other means may be employed to operate the same, or it may be only partially operated by electricity, if desired.

We claim—

1. In a labeling-machine, the combination of an electric pick-up device adapted to separate the top label from a pile of labels, a plate adapted to be moved beneath the top label thus attracted and a paste-roller adapted to be reciprocated over the plate and thereby apply paste to the label.

2. In a labeling-machine, the combination of an electric pick-up device for attracting and separating the top label from a pile of labels, a reciprocating plate adapted to be moved beneath the top label thus attracted, mechanism for applying paste to the label while resting upon the plate and a frame adapted to roll the article, to be labeled, over the label.

3. In a labeling-machine, the combination of a label box or receptacle to contain labels, a reciprocating rod arranged above the box, means for charging the rod with electricity whereby as the rod is moved into proximity to the labels the top one thereof will be attracted, a plate adapted to be moved beneath the label after being thus raised and mechanism for applying paste to the label as it rests upon the plate.

4. In a labeling-machine, the combination of a box or receptacle to contain labels, a reciprocating rod arranged above the box, means for charging the rod with electricity whereby as the rod is advanced to a position in proximity to the labels the top one thereof will be attracted and separated from the pile, a plate adapted to be reciprocated beneath the label after being picked up, paste-applying mechanism and means for moving or rolling the package or article over the label.

5. In a labeling-machine, the combination of a box or receptacle to contain labels, a reciprocating rod arranged above the box, a static electricity-generator, a connection between the generator and rod, a plate adapted to be moved beneath the top label after being attracted by the charged rod, paste-applying mechanism, and means for rolling the article over the label.

6. In a labeling-machine, the combination of an electric pick-up device adapted to separate the top label from a pile of labels, a plate adapted to be moved beneath the top label thus attracted, paste-applying mechanism, and a frame having both a swinging and reciprocating movement for engaging and rolling the article over the label.

7. In a labeling-machine, the combination of a reciprocating rod, means for charging the rod with static electricity whereby as the rod is moved into proximity to the labels the top one thereof is attracted and separated from the remainder, a plate adapted to be moved beneath the label thus attracted, paste-applying mechanism, a cross-head adapted to reciprocate above the machine-bed and a frame pivotally mounted upon the cross-head and adapted to engage and roll the article to be labeled over the label in the forward stroke of the cross-head.

8. In a labeling-machine, the combination of a label-box to contain labels, an electric pick-up device adapted to separate the top label from the remainder, a plate adapted to be moved below the top label after being picked up and means for gumming the label.

9. In a labeling-machine, the combination of a box to contain labels, a rod mounted above the box, electrically-controlled means for reciprocating the rod, means for charging the rod with static electricity, whereby as the rod is advanced to a position in proximity to the labels the top one thereof will be attracted and separated from the succeeding labels, a plate adapted to be moved beneath the label after being thus raised and electrically-controlled means for reciprocating the plate.

10. In a labeling-machine, the combination of a box to contain labels, an electrical device adapted to pick up the top label and separate it from the remainder, a plate adapted to be moved beneath the label after being picked up, means for applying paste to the label and means for moving or rolling the package or bottle over the label.

11. In a labeling-machine, the combination of a label-holding receptacle, a pick-up device adapted to raise one label at a time, a plate adapted to move below the label thus picked up and above the open end of the receptacle, means for applying paste to the labels and a reciprocating frame adapted to engage the article that is to receive the label and to roll it over the label upon the plate.

12. In a labeling-machine, the combination of a label-holding box or receptacle, means for picking up one label at a time, a slide-plate adapted to be moved below the picked up label, paste-applying mechanism, means for rolling and pressing the article to be labeled over the pasted label and a device for feeding the articles one at a time.

13. In a labeling-machine, the combination of a box to contain labels, means for applying paste to the labels, a cross-head reciprocating above the label-box in guides substantially horizontal with the machine-bed, means for reciprocating the cross-head, and a swinging frame pivoted to the cross-head and adapted to swing downward during one of its reciprocations to engage the article to be labeled whereby the same will be pressed against and rolled over upon the label.

14. In a labeling-machine, the combination of a label-holding box or receptacle, means for normally forcing them therefrom, a reciprocating frame located thereabove, a traveling paste-roller connected to the frame, and a pressure-plate pivoted to the frame whereby after paste is applied to the label by the traveling roller the article to be labeled will be engaged by the frame and moved over the label.

15. In a labeling-machine, the combination of a box or receptacle adapted to contain labels, a reciprocating rod or plunger arranged substantially at right angles to the label-box and charged with static electricity, means for reciprocating the plunger, whereby as the plunger is moved into proximity to the pile of labels the top one thereof may be attracted and separated from the remainder, a plate adapted to be moved beneath the label after being thus separated, mechanism for applying paste to the label upon the plate and means for moving or rolling the article to be labeled over the label.

16. In a labeling-machine, the combination of a box or receptacle to contain labels, a reciprocating rod or plunger arranged substantially at right angles to the label-box and charged with static electricity, means for reciprocating the plunger whereby as the plunger is moved into proximity to the pile of labels it will attract the top one thereof by virtue of its charge of electricity and thereby separate the same from the remainder, a flat reciprocating plate adapted to be moved beneath the label after being thus separated, means for reciprocating the plate and a reciprocating frame adapted to engage the article to be labeled and press and roll the same over the label upon the plate.

17. In a labeling-machine, the combination of a label box or receptacle to contain labels, means for applying paste to the labels, a slide-plate adapted to be reciprocated over the end of the box, a plunger charged with static electricity and adapted to be reciprocated into proximity to the labels, and a frame located above the label-box and adapted to both reciprocate and swing downward to engage the article to be labeled, thereby pressing and rolling the same over the label.

18. The combination of a box B to contain labels, a traveling paste-roller F', and a device for pressing and rolling the article over a pasted label comprising a cross-head $e$ reciprocating in horizontal guides in a frame E, means for reciprocating the same and a pressure-plate F pivotally connected to the cross-head.

19. The combination of a box B to contain labels, a cross-head $e$ traveling in a frame E', a pressure-plate F pivotally connected to the cross-head by links $f, f'$, the links $f'$ being extended below their pivotal points, a traveling paste-roller $F^2$ mounted in the extended portion of the links $f'$, whereby the pressure-plate will be swung downward but only at the withdrawing stroke of the cross-head and paste-roller.

20. In a labeling-machine, the combination of an electric pick-up device adapted to attract and separate the top label from a pile of labels, a plate adapted to be moved beneath the top label thus attracted, a cross-head reciprocating above the plate and labels, a paste-roller arranged upon the cross-head, a drive-wheel, and a crank-arm between the cross-head and paste-roller shaft.

21. In a labeling-machine, the combination of a reciprocating rod or plunger, means for charging and discharging the same at predetermined intervals, means for reciprocating the rod whereby as it is moved into proximity to a pile of labels the top one thereof will be attracted and separated from the remainder, a slide-plate adapted to be moved beneath the top label thus attracted, a cross-head reciprocating above the plate and labels, a pressure-plate, links $f$ and $f'$, for pivotally connecting the pressure-plate to the cross-head, the set of links $f'$ being extended below the point of connection with the cross-head, a paste-roller mounted in such extended portion of the links and means for reciprocating the paste-roller and thereby actuate the cross-head and pressure-plate.

JOHN FRANCIS SMALL.
JOHN STUART BIGGAR.

Witnesses:
H. F. THOMSEN,
W. J. BIGGAR.